(12) United States Patent
Chung et al.

(10) Patent No.: US 8,856,820 B2
(45) Date of Patent: Oct. 7, 2014

(54) MOBILE COMMUNICATION TERMINAL AND METHOD OF RESTRICTING HARMFUL INFORMATION THEREOF

(75) Inventors: Min-hyung Chung, Yongin-si (KR); Myung-jin Eom, Yongin-si (KR); Seung-ho Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1615 days.

(21) Appl. No.: 11/654,531

(22) Filed: Jan. 18, 2007

(65) Prior Publication Data
US 2007/0256092 A1 Nov. 1, 2007

(30) Foreign Application Priority Data
May 1, 2006 (KR) .................. 10-2006-0039333

(51) Int. Cl.
 H04N 7/16 (2011.01)
 H04N 21/475 (2011.01)
 H04N 21/454 (2011.01)
 H04N 21/84 (2011.01)
 H04N 21/414 (2011.01)
 H04N 21/45 (2011.01)

(52) U.S. Cl.
 CPC ........... *H04N 7/163* (2013.01); *H04N 21/4755* (2013.01); *H04N 21/4542* (2013.01); *H04N 21/84* (2013.01); *H04N 21/41407* (2013.01); *H04N 21/4532* (2013.01)
 USPC .................. 725/28; 725/27; 725/29; 725/30; 725/31; 455/26.1; 455/515

(58) Field of Classification Search
 USPC .............................. 725/25–31; 455/26.1, 515
 See application file for complete search history.

(56) References Cited

U.S. PATENT DOCUMENTS

| 4,947,429 | A  | * | 8/1990  | Bestler et al. | 380/241 |
| 7,444,402 | B2 | * | 10/2008 | Rennels        | 709/224 |
| 2002/0001386 | A1 | * | 1/2002 | Akiyama       | 380/201 |
| 2004/0015985 | A1 | * | 1/2004 | Kweon         | 725/30 |
| 2004/0060059 | A1 | * | 3/2004 | Cohen          | 725/30 |

(Continued)

FOREIGN PATENT DOCUMENTS

| JP | 08227305 A      | * | 9/1996  | ............. G05B 19/05 |
| JP | 2002024666 A    | * | 1/2002  |                          |
| JP | 2005229375 A    | * | 8/2005  | ............... H04Q 7/20 |
| KR | 1020050097774 A |   | 10/2005 |                          |

OTHER PUBLICATIONS

Translated Abstract for Tsuzuki japanese patent document.*
Translation for JP 408227305 A, All Pages.*

Primary Examiner — Jason Salce
(74) Attorney, Agent, or Firm — Sughrue Mion, PLLC (57) ABSTRACT

A mobile communication terminal and a method of restricting harmful information thereof are provided. The mobile communication terminal includes a data judgment module which judges whether to restrict digital content by comparing content information included in a packet of the digital content with viewing restriction information; and a control unit which controls whether to display the digital content in accordance with a result of the judgment of the data judgment module. The method includes receiving digital content that is transmitted in a unit of a packet; judging whether viewing of the digital content is permitted by comparing content information included in the packet with viewing restriction information; and preventing a display of the digital content if it is judged that the viewing of the digital content is not permitted.

48 Claims, 5 Drawing Sheets

(56) References Cited

U.S. PATENT DOCUMENTS

| | | | |
|---|---|---|---|
| 2004/0227816 A1* | 11/2004 | Sato et al. | 348/152 |
| 2004/0261114 A1* | 12/2004 | Addington et al. | 725/106 |
| 2005/0097595 A1* | 5/2005 | Lipsanen et al. | 725/25 |
| 2006/0052134 A1* | 3/2006 | Sato | 455/556.1 |
| 2006/0236351 A1* | 10/2006 | Ellerbrock et al. | 725/81 |
| 2006/0246944 A1* | 11/2006 | Srinivas | 455/557 |
| 2006/0277565 A1* | 12/2006 | Long et al. | 725/28 |
| 2007/0044121 A1* | 2/2007 | Parekh et al. | 725/45 |

* cited by examiner

| | VIEWING GRADE OF VIEWING RESTRICTION INFORMATION OF MOBILE COMMUNICATION TERMINAL SIDE | VIEWING GRADE OF VIEWABLE CONTENT INFORAMTION |
|---|---|---|
| 1 | AA, A18 | AA, A18, A17, A13, A6, PA |
| 2 | A6 | AA, A6 |
| 3 | A13 | AA, A6, A13 |
| 4 | A17, PA | AA, A6, A13, A17, PA |

MOBILE COMMUNICATION TERMINAL AND METHOD OF RESTRICTING HARMFUL INFORMATION THEREOF

This application claims priority from Korean Patent Application No. 10-2006-039333, filed on May 1, 2006, in the Korean Intellectual Property Office, the disclosure of which is incorporated herein by reference.

BACKGROUND OF THE INVENTION

1. Field of the Invention

Apparatuses and methods consistent with the present invention relate to a mobile communication terminal and a method of restricting harmful information thereof, and more particularly to a mobile communication terminal and a method of restricting harmful information thereof, which can prevent juveniles and children from being exposed to harmful information such as violence and lewdness, and thus be helpful for their mental health.

2. Description of the Related Art

Recently, the field of a mobile communication service has been extended from a voice call service that is the inherent service field of the mobile communication to a wireless data service. With the development of network technologies such as the multifunctionalization of a mobile communication terminal and improvement of a data transmission speed, the wireless data service has been developed from a text-oriented service into a multimedia service.

One of such multimedia services is a video on demand (VOD) service. This VOD service is a service that makes it possible to download video media to be viewed later, or to display the video media in real time, and various kinds of moving image download services and real-time relay services may be representative VOD services. VOD transmission is classified into a download type and a streaming type, and in order to transmit massive multimedia information through limited transmission bandwidth resources, it is general to use compression techniques such as Motion Pictures Expert Group 4 (MPEG-4) and so on.

Since these VOD services make it possible to receive digital images provided from mobile communication service providers and content providers through mobile communication networks, irrespective of time and place, it is expected that such services will be used even more with the spread of color terminals.

On the other hand, a digital multimedia broadcast (DMB) service, which is another multimedia service, has recently been under way. DMB is a broadcasting service that modulates diverse multimedia signals such as audio and video signals to digital signals and provides the digital signals to a mobile phone or portable/vehicle broadcasting receiver, and thus is called a "TV in hand".

DMB is based on a digital audio broadcasting (DAB) that is a technology for digital radio receivers, and the multimedia broadcasting concept is added to the DAB, so that moving images and data information such as weather, news, and location, can be additionally transmitted.

DMB is divided into a terrestrial DMB and a satellite DMB. According to the terrestrial DMB, a broadcasting center for a satellite DMB sends programs to a satellite, and the satellite spreads the programs all over the country through radio waves so that DMB terminals in all parts of the country can receive the programs. According to the terrestrial DMB, programs are transmitted on the ground using frequencies, and broadcasting signals are transmitted through terrestrial base stations using very high frequency (VHF) Channel #12 and Channel #8 for a military purpose.

On the other hand, as the use of the mobile communication terminal has been popularized, many children and juveniles possess mobile communication terminals, and thus not only adults but also children and juveniles can use services of VOD, terrestrial DMB, and satellite DMB.

Among content provided through the VOD services and DMB services, harmless content that can be viewed by children and juveniles and harmful content that is content for adults including violence, sex, slang, and others, coexist. Accordingly, under the current mobile communication services, children and juveniles may be exposed to content for adults without distinction, and this may cause their mental health to be injured.

In the case of a television broadcasting program that is not right for children and juveniles, a warning message requesting to restrict children/juveniles' viewing of the program is displayed on the display screen before the program is broadcast, and a mark indicating an age subject to viewing restriction is displayed during the time that the program is broadcast. However, such a display of the mark for viewing restriction on the screen is almost ineffectual in preventing the children and juveniles from viewing the program, and especially, during their parents/protectors' absence, there is no way to intercept or prevent their viewing of the program.

In the case of a computer, programs to prevent children and juveniles from accessing predetermined specified sites have been developed in order to prevent the children and juveniles from imprudently accessing the corresponding content through the Internet. However, the user should individually set sites to be prohibited whenever such harmful sites are newly created. In addition, in the case of sites of which prohibition has not been set, there is no way to intercept the access of such sites.

On the other hand, in a VOD service or a DMB service using a mobile communication terminal, no protection device capable of preventing the providing of content for adults to children or juveniles has been proposed. Accordingly, it is desirable to find a method of preventing children and juvenile from viewing harmful digital content, such as content for adults, through mobile communication terminals.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, a mobile communication terminal is provided. The mobile communication terminal includes a data judgment module which judges whether to restrict digital content by comparing content information included in a packet of the digital content with viewing restriction information, and a control unit which controls whether to display the digital content in accordance with the result of judgment from the data judgment module.

The viewing restriction information may be a standard of judgment of whether it is permitted for a user to view the digital content.

The data judgment module may include an information storage unit which stores the viewing restriction information, and a viewing judgment unit which judges whether the user can view the digital content by comparing the content information included in the packet with the viewing restriction information and providing the result of the judgment to the control unit.

The content information may include at least one of viewing grade information according to an age of a viewer of the digital content, a title, a genre, a speech, a provider, a performer, and a providing channel.

The viewing restriction information may include at least one of a user's age, an age group, viewing grade information, a word set by the user, a title, a genre, a speech, a provider, a performer, and a providing channel.

The mobile communication terminal may further include a receiving unit which receives the packet of the digital content, and a data processing module which processes the packet received through the receiving unit to provide the packet in a displayable state.

If it is judged by the viewing judgment unit that the viewing of the digital content is not permitted, the control unit may intercept a transfer of the packet from the receiving unit to the data processing module, control the data processing module to scramble the packet, or control the data processing module not to decompress the packet.

The mobile communication terminal may further include a packet generation unit which generates a response packet to be transmitted to the provider of the digital content, and a packet transmission unit which transmits the generated response packet to the provider by using information about the provider included in the packet received through the receiving unit.

If the provider of the digital content of which the viewing is not permitted requests the viewing of the digital content, the control unit may control the packet generation unit to generate the response packet for refusing the viewing of the digital content, and control the packet transmission unit to transmit the response packet.

The viewing judgment unit may include a parsing part which parses a region of the packet where the content information is stored, an information extraction part which extracts the content information by decoding the parsed packet region, and a judgment part which reads the viewing restriction information from the information storage unit and judges whether the viewing of the digital content is permitted by comparing the content information with the viewing restriction information.

The information storage unit may be a built-in memory that includes at least one of a flash memory and a random access memory (RAM), a detachable external memory, or a subscriber identification module (SIM) card.

The mobile communication terminal may further include a multi-card reader which reads information stored in the memory card and provides the read information to the viewing judgment unit, and the information storage unit may be at least one of a secure digital card (SD card) that is a memory card, a multimedia card (MMC), a memory stick, a compact flash card (CF card), a smart media card (SM card) and a micro drive card (MD card).

The viewing restriction information stored in the information storage unit can be changed by a predetermined person.

The digital content may be at least one of a voice, a text, an image, a moving image and broadcasting information.

According to another aspect of the present invention, there is provided a method of restricting digital content for a mobile communication terminal, which includes receiving digital content that is transmitted in a unit of a packet, judging whether viewing of the digital content is permitted by comparing content information included in the packet with viewing restriction information, and preventing a display of the digital content if it is judged that the viewing of the digital content is not permitted.

According to another aspect of the present invention, there is provided a mobile communication terminal, which includes a data judgment module which judges whether to restrict a broadcasting stream by comparing broadcasting content information included in the broadcasting stream with viewing restriction information, and a control unit which controls whether to display the broadcasting stream in accordance with the result of judgment from the data judgment module.

The data judgment module may include an information storage unit which stores the viewing restriction information, and a viewing judgment unit which judges whether the user can view the broadcasting stream by comparing the broadcasting content information included in the broadcasting stream with the viewing restriction information and providing the result of judgment to the control unit.

The mobile communication terminal may further include a data processing module which processes the received broadcasting stream to provide the broadcasting stream in a displayable state.

If it is judged by the viewing judgment unit that the viewing of the broadcasting stream is not permitted, the control unit may intercept transferring of the packet from the receiving unit to the data processing module.

If it is judged by the viewing judgment unit that the viewing of the broadcasting stream is not permitted, the control unit may control the data processing module to scramble the broadcasting stream.

If it is judged by the viewing judgment unit that the viewing of the broadcasting stream is not permitted, the control unit may control the data processing module not to decompress the broadcasting stream.

The mobile communication terminal may further include a message generation unit which generates a response message to be transmitted to the provider of the broadcasting stream, and a message transmission unit which transmits the generated response message to the provider by using information about the provider included in the broadcasting stream.

If the provider of the broadcasting stream whose viewing of the broadcasting stream is not permitted requests the viewing of the broadcasting stream, the control unit may control the message generation unit to generate the response message for refusing the viewing of the broadcasting stream, and control the message transmission unit to transmit the response message.

The broadcasting stream may be of either a digital type or an analog type.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that exemplary embodiments of the present invention can be carried out without those defined matters. Also, well-known functions or constructions are not described in detail since they would obscure the invention in unnecessary detail.

The mobile communication terminal may have the function of locking certain digital contents of broadcasting streams which are harmful or inappropriate for underage users.

In the following exemplary embodiments of the present invention, the mobile communication terminal will be explained with two separate non-limiting examples in which the terminal receives digital contents, and the terminal receives broadcasting streams.

Figure 1:
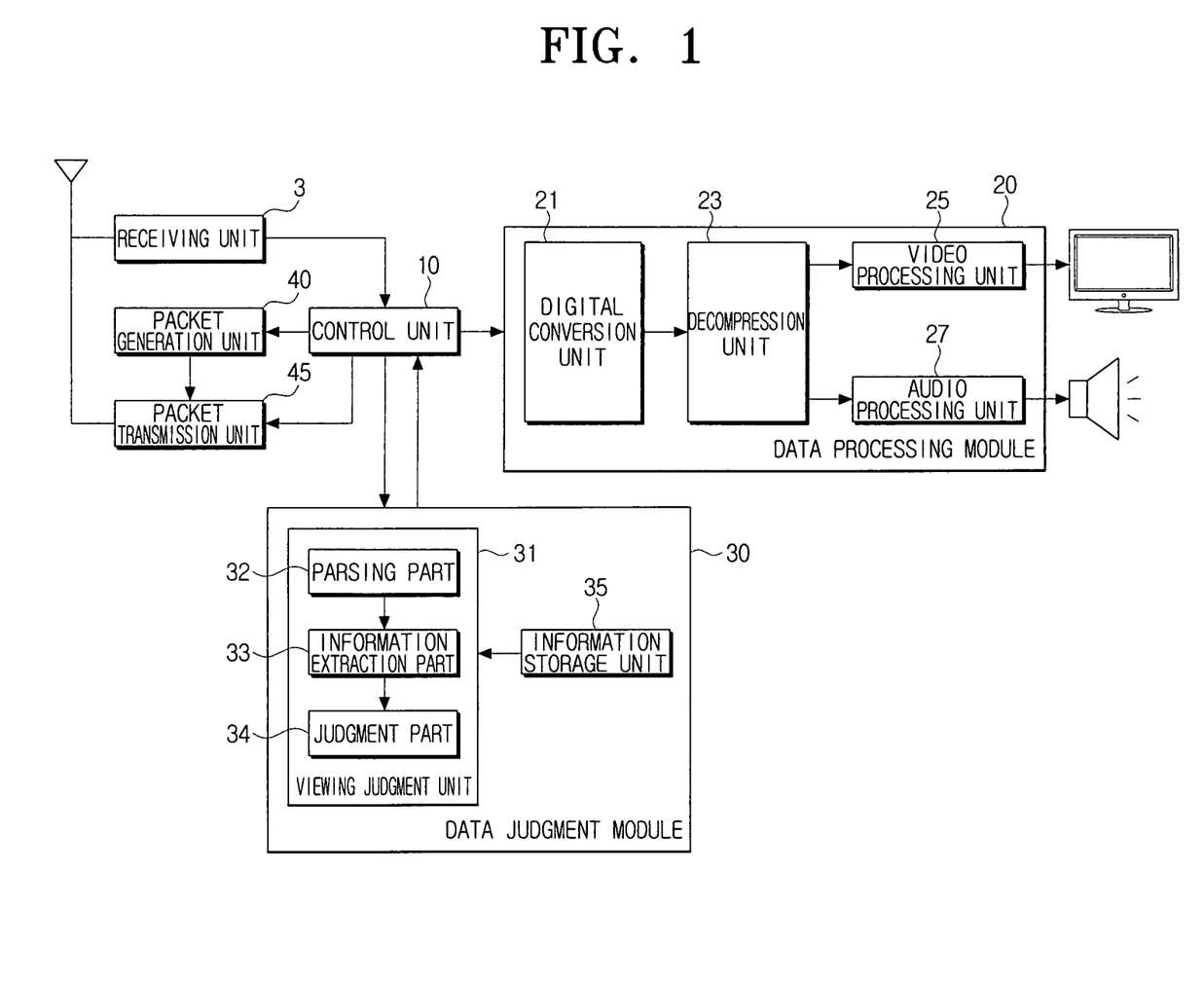
FIG. 1 is a block diagram illustrating a construction of a mobile communication terminal that processes digital content according to a first exemplary embodiment of the present invention.

FIG. 1 is a block diagram illustrating the construction of a mobile communication terminal that processes digital content according to a first exemplary embodiment of the present invention.

As illustrated in FIG. 1, the mobile communication terminal according to the first exemplary embodiment of the present invention includes a receiving unit 3, a data processing module 20, a data judgment module 30, a packet generation unit 40, a packet transmission unit 45, and a control unit 10.

The receiving unit 3 receives digital content provided from a digital content provider. The digital content includes a voice, a text, an image, a moving image and/or broadcasting information, and is provided through a VOD service or a DMB service. This digital content is provided in the form of a packet, and the packet may be classified into a transmission packet for reporting the transmission of content packets, and a content packet for carrying the digital content. The transmission packet is transmitted only at an initial transmission stage of the digital content to report the reception of the content packet, and the content packet may be directly transmitted in a state where the transmission packet is not transmitted. The content packets are continuously transmitted until the transmission of the digital content is completed, and each content packet is composed of a header including information on the digital content and a body including the digital content.

The information included in the header includes version information, the packet number, a transmission time, the number of transmitted packets, a payload type, information for discriminating between voice information and video information in the packet, an identifier field, and/or content information. The identifier field contains information on the identifier of a data source such as a camera or a microphone. The content information is information according to the corresponding digital content, and is compared with viewing restriction information stored in the user's mobile communication terminal to serve as a reference for determining whether the digital content can be viewed. This content information includes at least one of viewing grade information, a title, a genre, a speech, a provider, a performer, and a providing channel.

The viewing grade information denotes a plurality of viewing grades divided in accordance with viewable ages for the digital content, and may include a grade "AA" suitable for all ages, a grade "A6" suitable for children of 6 years of age or younger, a grade "A13" suitable for children of 13 years of age or younger, a grade "A17" suitable for juveniles of 17 years of age or younger, a grade "A18" suitable for adults of 18 years of age or younger, and a grade "PA" that requires a parent's guidance. These viewing grades match marks indicated in parentheses, and the respective viewing grades and marks may be changed depending on the broadcasting standard or use convenience.

A title, a genre, a speech, a provider, a performer, and a providing channel may be standards to determine whether to view digital content, and this is because in the case of digital content for adults, the title, genre, speech, provider, performer and providing channel may be specified. For example, in the case of the genre, juveniles of 17 years of age or younger may be unqualifiedly forbidden to view sex or violence. In addition, since channels are mostly characterized by movie for adults, animation for children, drama, show, sport, and others, whether any digital content can be viewed may be judged depending on its providing channel.

This content information may be inserted into the header or the body of the content packet, or may be inserted into the transmission packet.

The data processing module 20 includes a digital conversion unit 21, a decompression unit 23, a video processing unit 25, and an audio processing unit 27.

The digital conversion unit 21 converts the digital content that is input in the form of an analog signal into a digital signal and corrects errors. The digital content converted into the digital signal by the digital conversion unit 21 is provided to the decompression unit 23.

The decompression unit 23 decompresses the packet of the digital content converted into the digital signal. Generally, the digital content is compressed by a compression technique such as MPEG-3 and MPEG-4. The decompression unit 23 decompresses the digital content, and provides the decompressed digital video and audio signals to the video processing unit 25 and the audio processing unit 27, respectively.

The video processing unit 25 decodes the decompressed digital video signal so that the digital video signal can be displayed on a display panel.

The audio processing unit 27 decodes the decompressed digital audio signal and amplifies the decoded analog audio signal to output the amplified audio signal to a speaker and an earphone.

The data judgment module 30 judges whether the user of the mobile communication terminal can view the digital contents and provides the result of the judgment to the control unit 10, and includes an information storage unit 35 and a viewing judgment unit 31.

The information storage unit 35 stores user information about the user who uses the mobile communication terminal, and the user information includes viewing restriction information that is the reference for judging whether the user can view certain digital content. The viewing restriction information includes at least one of a user's age, an age group, viewing grade information, a word set by the user, a title, a genre, a speech, a provider, a performer, and a providing channel.

The user's age, the age group, and the viewing grade information may be stored all together, or only one of them may be stored. In this case, the age group is not displayed in the form of teens, twenties, thirties, and so on, but is displayed as an age group set on the same basis as the viewing grade information. For example, it may be displayed in the form of an age group of 0~6, 7~13, 14~17, or 18 and over.

The viewing grade information is prepared in the same form as the viewing grade information of the content information included in the content packet, and is set to match the age of the user who uses the corresponding mobile communication terminal. For example, in the case of an adult, "AA" or "A17" grade is stored as the viewing grade information. In the case of age groups of 6 years of age or younger and 13 years of age or younger, an "A6" grade and an "A13" grade are stored, respectively. In the case of an age group of 13 to 17 years of age, a "PA" grade or an "A17" grade is stored as the viewing grade information.

In addition, the word, title, genre, speech, provider, performer, and providing channel are set by the user or a user's protector. Only an adult can directly set these terms as the user, and in the case of children and juveniles of 17 years of age or younger, a user's protector, such as a user's parent, a grandparent, or a relative, can set the terms. The user's age, age group, and viewing grade can also be set by the user or the user's protector.

Once the viewing restriction information is set and stored in the information storage unit 35, it can be changed only by resetting the information storage unit 35. In other words, the user or the user's protector cannot directly change the viewing restriction information, but the viewing restriction information can be changed by an after-sales service center or an agency. In order for a user of 17 years of age or younger to change the viewing restriction information, he/she should visit the after-sales service center or agency, being accompanied by his/her protector, so that the user of 17 years of age or younger can be prevented from changing the viewing restriction information without permission.

The information storage unit 35 in which the viewing restriction information is stored may be implemented by a flash memory or a random access memory (RAM) provided in the mobile communication terminal or by a detachable external memory or a subscriber identification module card (SIM card). Also, in the case where a multi-card reader is installed in the mobile communication terminal, the information storage unit 35 may be implemented in the form of a card readable by the multi-card reader, such as a secure digital card (SD card) that is a memory card, a multimedia card (MMC), a memory stick, a compact flash card (CF card), a smart media card (SM card), and a micro-drive card (MD card).

The SIM card, which is a subscriber authentication module, stores information on the subscriber, and has a high security. In the case of implementing the information storage unit 35 by the SIM card, a user can use the mobile communication terminal having the SIM card mounted thereon, and can use digital content suitable for the user irrespective of the type of the mobile communication terminal that the user uses.

In the case of using a multi-card reader, the user information may be stored in any one of the SD card, MMC card, memory stick, CF card, SM card, and MD card, as the information storage unit 35. In this case, however, the multi-card used as the information storage unit 35 should be set in such a manner that the change of the information stored in the multi-card is impossible. In order to prevent a child or a juvenile from mounting another user's multi-card on his/her mobile communication terminal and downloading digital content for adults, it is advantageous if authentication information capable of authenticating the multi-card is separately stored in both the multi-card reader and the multi-card. As the authentication information, the serial number of a mobile communication terminal, a user's name, or various numbers may be diversely used. The various numbers may be predetermined.

On the other hand, the viewing judgment unit 31 judges whether the viewing of the input digital content is possible, i.e., is permitted, by comparing the content information included in the packet of the digital content with the viewing restriction information stored in the information storage unit 35.

The viewing judgment unit 31 includes a parsing part 32, an information extraction part 33, and a judgment part 34.

The parsing part 32 parses a region of the transmission packet or the content packet in which the content information is included. That is, in the case where the content information is inserted into the transmission packet, the parsing part parses the corresponding region of the transmission packet, while in the case where the content information is inserted into the header or the body of the content packet, the parsing part parses the corresponding region.

The information extraction part 33 extracts the content information by decoding the parsed packet region.

The judgment part 34 reads the viewing restriction information from the information storage unit 35, judges whether the viewing of the content is possible, i.e., permitted, by comparing the content information with the viewing restriction information, and provides the result of judgment to the control unit 10. In this case, the judgment part 34 may compare respective items of the content information with those of the viewing restriction information, or may compare an item of the content information with that of the viewing restriction information. The item may be predetermined.

Figure 2:
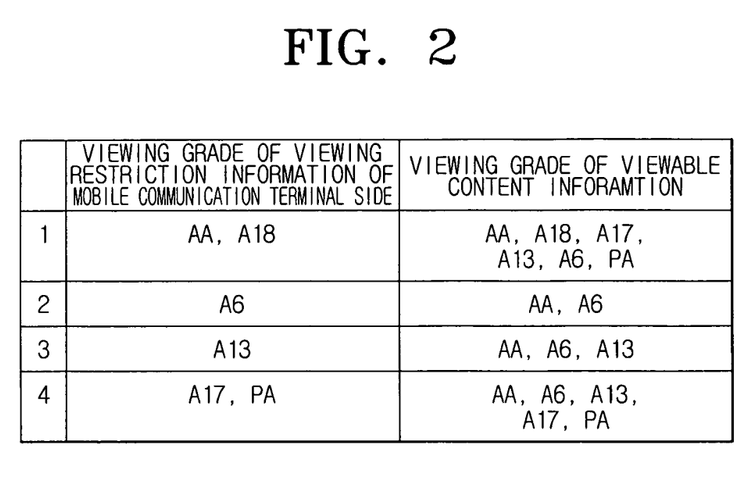
FIG. 2 is a table representing viewing grades of digital content that can be viewed according to the viewing grade of the mobile communication terminal of FIG. 1.

The judgment part 34 may compare the viewing grade information of the viewing restriction information with that of the content information, and in this case, the judgment part 34 judges whether the viewing of the digital content is possible on the basis of a table, an example of which is illustrated in FIG. 2. In the case where the viewing grade of the viewing restriction information is "A18", the judgment part 34 judges that the viewing of the content is permitted if the viewing grade of the content information is "AA", "A18", "A17", "A13", "A6", or "PA". That is, in the case where the viewing grade is for "adults", the digital content of all the viewing grades can be viewed irrespective of the viewing grade of the content information. In the case where the viewing grade of the viewing restriction information is "A6", the judgment part 34 judges that the viewing of the content is permitted if the viewing grade of the content information is "AA" or "A6". In the case where the viewing grade of the viewing restriction information is "A13", it is judged that it is permitted to view only the digital content of which the viewing grade is "AA", "A6", or "A13". In the case where the viewing grade of the viewing restriction information is "PA" or "A17", it is judged that it is permitted to view only the digital content of which the viewing grade is "AA", "A6", "A13", "A17" or "PA".

In the case where the viewing grade of the viewing restriction information is "A13", the judgment part 34 judges that the viewing of the digital content is impossible, i.e., not permitted, if the viewing grade of the content information included in the corresponding digital content is "A17". However, when the viewing grade of the viewing restriction information is "A17" and the viewing grade of the digital content is "A13", the judgment part 34 judges that the viewing of the corresponding digital content is permitted.

The packet generation unit 40 generates a response packet to be transmitted to the provider of the digital content. The response packet is generated when the viewing of the digital content is permitted but it is to be selected whether to view or download the digital content, in the case where the judgment part 34 judges that the viewing of the digital content is not permitted. The packet generation unit 40 generates the response packet that includes a message to report whether to view the digital content.

The packet transmission unit 45 transmits the response packet to the provider of the digital content. Information on the provider is included in the identifier information included in the received content packet.

The control unit 10 controls whether to display the digital content in accordance with the result of the judgment from the data judgment module 30. If the viewing judgment unit 31 judges that the viewing of the digital content is permitted, the control unit 10 controls the data processing module 20 to output the corresponding digital content.

By contrast, if the viewing judgment unit 31 judges that the viewing of the digital content is not permitted, the control unit 10 controls the data processing module not to output the corresponding digital content. In this case, depending on whether the corresponding digital content is a charged digital content, i.e., fee-based digital content, the process of the digital content that is performed by the control unit 10 differs.

If the digital content is free of charge, the control unit 10 can intercept the content packet by three methods as follows. First, the control unit 10 can prevent the output of the digital content by intercepting the digital content being provided to the digital conversion unit 21. Second, the control unit 10 can provide the digital content to the digital conversion unit 21 to convert the analog type content into digital type content, and control the decompression unit 23 not to decompress the main frame. Third, the control unit 10 can provide the decompressed content packet to the video processing unit 25 and control the video processing unit 25 to scramble the content packet. In this latter case, the corresponding digital content is displayed on the display panel in a scrambled state.

If the digital content is a charged content, i.e., content for a fee, the provider may ask the user whether to download or view the digital content, and only when the user gives a response for requesting the downloading or viewing of the digital content to the provider does the provider transmit the content packets to the user. Accordingly, if the viewing of the digital content is not permitted and the corresponding digital content is fee-based content, the control unit 10 controls the packet generation unit 40 and the packet transmission unit 45 to generate and transmit a response packet to the provider of the corresponding digital content to refuse the viewing or downloading of the corresponding digital content. In addition, the control unit 10 intercepts the digital content packets being provided to the data processing module 20.

Figure 3:
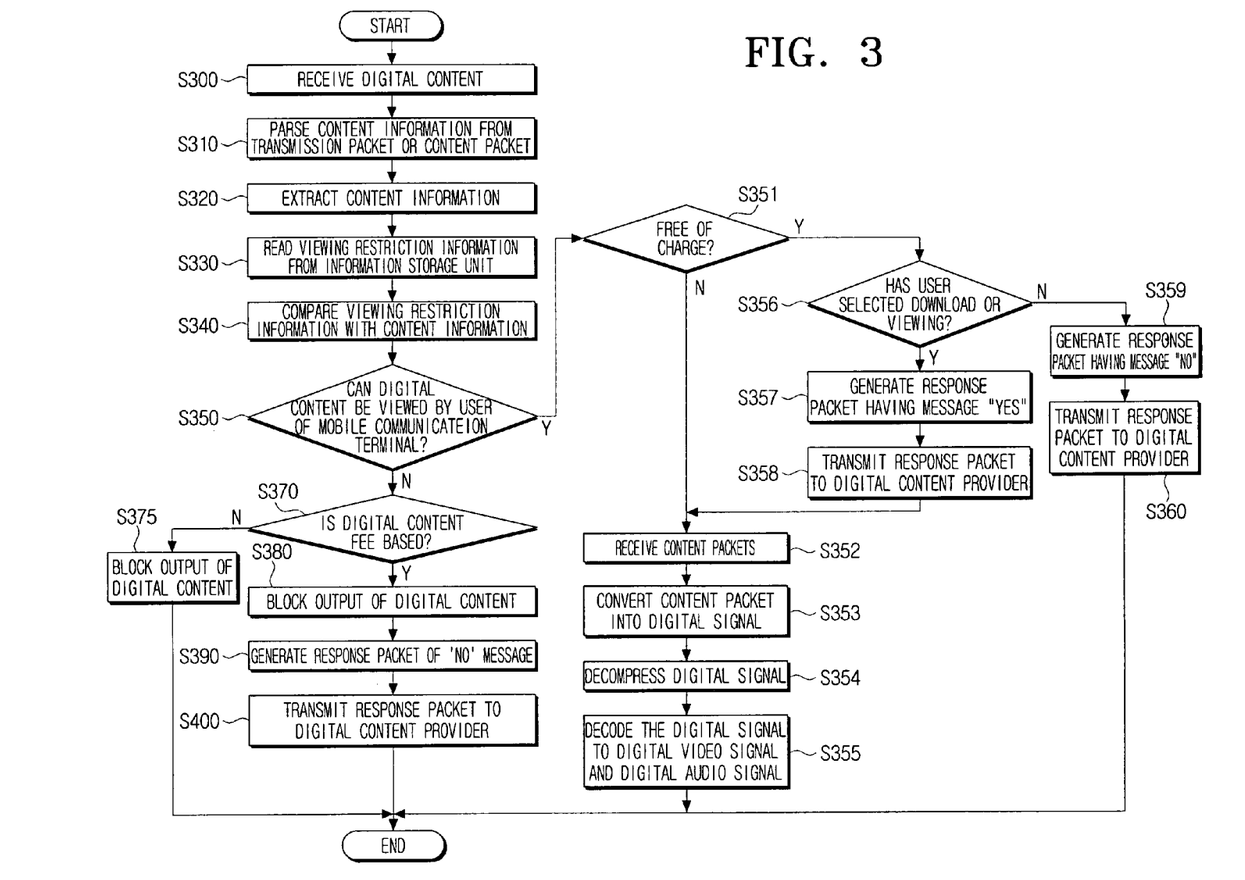
FIG. 3 is a flowchart illustrating a process of restricting the viewing of digital content that is performed in the mobile communication terminal of FIG. 1.

A process of restricting the viewing of the digital content that is performed by the mobile communication terminal having the above-described construction will now be explained with reference to FIG. 3.

If a transmission packet or content packet of digital content is received through the receiving unit 3 (S300), the control unit 10 operates the data judgment module 30. The viewing judgment unit 31 of the data judgment module 30 parses a region of the transmission packet or content packet in which content information is stored (S310), and extracts the content information by decoding the parsed packet region (S320).

Then, the viewing judgment unit 31 reads viewing restriction information from the information storage unit 35 (S330), and judges whether the user of the mobile communication terminal can view the digital content by comparing the content information with the viewing restriction information (S340).

In this case, the viewing judgment unit 31 may compare respective items of the viewing restriction information with those of the content information, respectively, or may compare viewing grade information of the viewing restriction information with that of the content information.

It is determined if the digital content can be viewed by the user of the mobile communication terminal (S350). If it is determined that the viewing of the digital content is permitted (S350-Y) as a result of judgment by the viewing judgment unit 31, the viewing judgment unit 31 provides the result of the judgment to the control unit 10, and the control unit judges whether the digital content is fee-based digital content or free of charge (S351). If it is determined that the digital content is free of charge (S351-N), the control unit 10 receives the content packets (S352), and provides the content packets of the digital content to the digital conversion unit 21 of the data processing module 20. The content packets are converted into a digital signal (S353). The digital signal is decompressed (S354), and the digital signal is decoded to a digital video signal and a digital audio signal (S355). The digital video signal and the digital audio signal of the digital content, having passed through the digital conversion unit 21 and the decompression unit 23, are processed by the video processing unit 25 and the audio processing unit 27, and then output to the display panel and the speaker.

On the other hand, if it is determined that the viewable digital content is a charged content, i.e., a fee-based content (S351-Y), a message to ask whether the user wants to view or download the content is displayed along with a message to report that the corresponding digital content is a fee-based digital content, and it is determined if the user had selected to download or view the content (S356). If the user selects to view or download the digital content (S356-Y), the control unit 10 controls the packet generation unit 40 to generate a response packet corresponding to "YES" (S357), and the response packet is transmitted to the digital content provider (S358). On the other hand, if the user refuses to view or download the digital content (S356-N), the control unit 10 controls the packet generation unit 40 to generate a response packet corresponding to "NO" (S359). Then, the packet transmission unit 45 transmits the response packet to the provider of the digital content (S360).

If the response packet corresponds to "YES", the provider of the digital content continuously transmits the following content packets. The content packets are received (S352), converted to a digital signal (S353), the digital signal is decompressed (S354) and decoded into a digital video signal and a digital audio signal (S355), and output. If the response packet corresponds to "NO", the provider of the digital content does not transmit the following content packets.

On the other hand, if it is determined that the viewing of the digital content is not possible at operation S350 as a result of the judgment by the viewing judgment unit 31 (S350-N), the viewing judgment unit 31 provides the result of the judgment to the control unit 10, and the control unit judges whether the digital content is a charged, i.e. fee-based digital content or free of charge content (S370). If it is determined that the digital content is free of charge, the control unit 10 blocks the output of the digital content (S375). In this case, the control unit may block the output of the digital content by intercepting the digital content being provided to the digital conversion unit 21, controlling the decompression unit 23 not to decompress the main frame, or controlling the video processing unit 25 to scramble the content packets.

If it is determined that the digital content is a fee-based content, the control unit 10 blocks the output of the digital content (S380). The control unit 10 controls the packet generation unit 40 to generate a response packet corresponding to "NO" (S390), and controls the packet transmission unit 45 to transmit the generated response packet to the provider of the digital content (S400).

Figure 4:
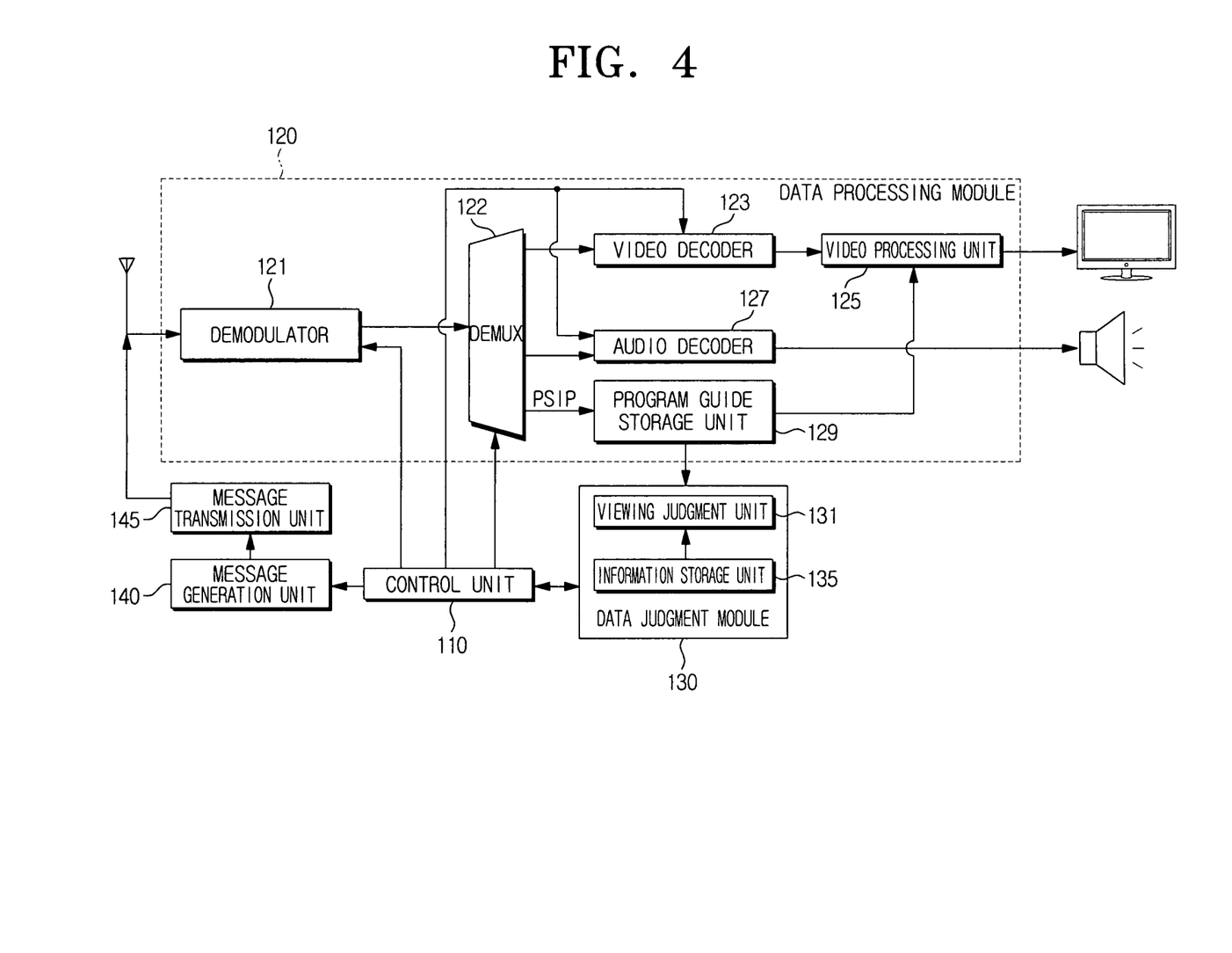
FIG. 4 is a block diagram illustrating a construction of a mobile communication terminal that processes a broadcasting stream according to a second exemplary embodiment of the present invention.

FIG. 4 is a block diagram illustrating the construction of a mobile communication terminal that processes a broadcasting stream according to a second exemplary embodiment of the present invention.

Generally, a broadcasting stream may be classified into an analog broadcasting stream and a digital broadcasting stream, and the construction of a mobile communication terminal may differ depending on whether the mobile communication terminal processes the analog broadcasting stream or the digital broadcasting stream.

In the exemplary embodiment of the present invention, it is exemplified that the mobile communication terminal has a construction to process the digital broadcasting stream. However, the present inventive concept can also be applied to the analog broadcasting stream.

The mobile communication terminal of FIG. 4 includes a data processing module 120, a data judgment module 130, a control unit 110, a message generation unit 140, and a message transmission unit 145.

The data processing module 120 includes a demodulator 121, a demultiplexer (DEMUX) 122, a video decoder 123, an audio decoder 127, a program guide storage unit 129, and a video processing unit 125.

The demodulator 121 demodulates the digital broadcasting stream and corrects any errors occurring in the stream.

The DEMUX 122 separates the demodulated digital broadcasting stream into a video stream, an audio stream, a program and system information (PSI), and a program and system information protocol (PSIP).

The video decoder 123 converts the video stream separated by the DEMUX 122 into an image. Generally, the video stream is compressed using MPEG-2, and thus the video decoder 123 may be an MPEG-2 decoder, or other similar type of decoder.

The audio decoder 127 converts the audio stream separated by the DEMUX 122 into a voice/audio signal, and thus the audio stream is decompressed using AC-3.

The program guide storage unit 129 stores the PSI and PSIP separated by the DEMUX 122. PSI has information on which program is selected among a plurality of programs, which packet is to be decoded, and how the packet is to be decoded, and information on a conditional access table used for only a permitted user to play the scrambled broadcasting stream.

PSIP is a collection of tables designed to process the broadcasting stream, and has a system for all virtual channels carried to the broadcasting stream and information on event levels. PSIP includes broadcasting content information, and in the same manner as the content information used in the first exemplary embodiment, the PSIP serves as a reference for determining whether to view the digital content by being compared with the viewing restriction information stored in the user's mobile communication terminal. This broadcasting content information includes at least one of a viewing grade information, title, genre, speech, provider, performer, and providing channel. The viewing grade information includes the same information as the viewing grade information used in the first exemplary embodiment.

The video processing unit 125 receives the PSI and PSIP information from the program guide storage unit 129, decodes the video stream, and descrambles the scrambled video stream.

The data judgment module 130 includes an information storage unit 135 and a viewing judgment unit 131.

The information storage unit 135 stores user information on the user who uses the mobile communication terminal, and the user information includes viewing restriction information that is a reference for judging whether the user can view a broadcasting stream. Since the viewing restriction information is the same as that in the first exemplary embodiment, the detailed explanation thereof will be omitted.

The viewing judgment unit 131 judges whether the viewing of the broadcasting stream is possible, i.e., is permitted, by comparing the broadcasting content information included in the PSIP of the broadcasting stream with the viewing restriction information stored in the information storage unit 135. Since the judgment process performed by the viewing judgment unit 131 is the same as that performed by the judgment part in the first exemplary embodiment, the detailed explanation thereof will be omitted.

The message generation unit 140 generates a response message to be transmitted to the broadcast provider. The response message is generated when the viewing judgment unit 131 judges that the viewing of the broadcasting stream is not possible. The message generation unit 140 generates the response message to report whether to view the broadcasting stream.

The message transmission unit 145 transmits the response message to the provider of the broadcasting stream. Information on the provider is included in the received broadcasting stream.

The control unit 110 controls whether to display the digital broadcasting stream in accordance with the result of the judgment from the data judgment module 130. If the viewing judgment unit 131 judges that the viewing of the broadcasting stream is permitted, the control unit 110 controls the data processing module 120 to output the corresponding broadcasting stream.

By contrast, if the viewing judgment unit 131 judges that the viewing of the broadcasting stream is not permitted, the control unit 110 controls the data processing module not to output the corresponding broadcasting stream. In this case, depending on whether the corresponding broadcasting stream is a charged, i.e., fee-based, broadcasting stream or free of charge and whether a charge for the broadcasting stream is made at a flat rate or by broadcasting streams, the process of the broadcasting stream that is performed by the control unit 110 differs.

If the broadcasting stream is free of charge or the charge for the broadcasting stream is made at a flat rate, the control unit 110 can intercept the broadcasting stream by four methods as follows. First, the control unit 110 may prevent the broadcasting stream from being demodulated by the demodulator 121. Second, the control unit 110 may intercept the demodulated broadcasting stream being separated into a video stream, audio stream, PSI and PSIP by the DEMUX 122. Third, the control unit 110 may prevent the video stream and the audio stream from being decoded by the video decoder 123 and the audio decoder 127, respectively. Fourth, the control unit 110 may prevent the scrambled video stream from being descrambled, or may scramble the unscrambled video stream. In this latter case, the corresponding broadcasting stream is displayed on the display panel in a scrambled state.

If the broadcasting stream is a charged, i.e., fee-based, broadcasting stream and the charge for the broadcasting stream is made by broadcasting streams, the provider asks the user whether to view the broadcasting stream, and only when the user gives a response for requesting the viewing of the broadcasting stream to the provider does the provider transmit the following broadcasting stream. Accordingly, if the viewing of the broadcasting stream is not permitted and the corresponding broadcasting stream is a fee-based broadcasting stream, the control unit 110 controls the message generation unit 140 and the message transmission unit 145 to generate and transmit a response message to the provider of the corresponding broadcasting stream to refuse the viewing of the corresponding broadcasting stream. In addition, the control unit 110 intercepts the broadcasting stream being provided to the data processing module 120.

Figure 5:
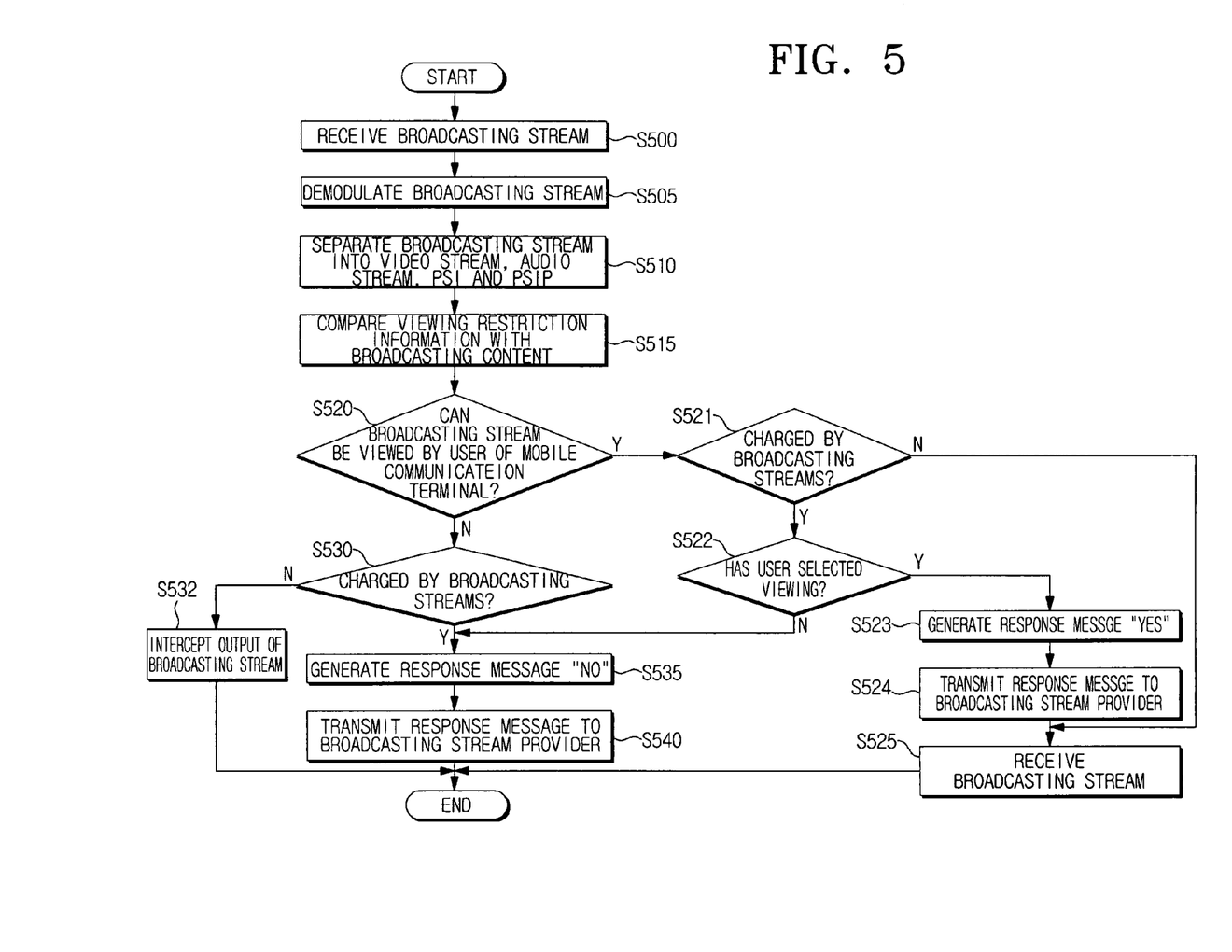
FIG. 5 is a flowchart illustrating a process of restricting the viewing of a broadcasting stream that is performed in the mobile communication terminal of FIG. 4.

A process of restricting the viewing of the broadcasting stream that is performed by the mobile communication terminal having the above-described construction will now be explained with reference to FIG. 5.

If the broadcasting stream is received (S500), the demodulator 121 demodulates the broadcasting stream (S505), and the DEMUX 122 separates the demodulated broadcasting stream into the video stream, audio stream, PSI, and PSIP (S510). The separated PSI and PSIP are stored in the program guide storage unit 129.

The viewing judgment unit 131 reads the broadcasting content information included in PSIP from the program guide storage unit 129, and reads the viewing restriction information from the information storage unit 135. Then, the viewing judgment unit judges whether the user of the corresponding mobile communication terminal can view the corresponding broadcasting stream by comparing the viewing restriction information with the broadcasting content information (S515).

The viewing judgment unit 131 may compare respective items of the viewing restriction information with those of the broadcasting content information, respectively, or may compare viewing grade information of the viewing restriction information with that of the broadcasting content information.

It is then determined if the broadcast stream can be viewed by the user of the mobile communication terminal (S520). If it is determined that the viewing of the digital content is permitted (S520-Y) as a result of judgment by the viewing judgment unit 131, the viewing judgment unit 131 provides the result of the judgment to the control unit 110, and the control unit 110 judges whether a charge is made by broadcasting streams. If it is determined that the charge is not made by broadcasting streams, i.e., if the broadcasting stream is free of charge or the charge for the broadcasting stream is made at a flat rate (S521-N), the control unit 110 receives and outputs the following broadcasting stream (S525).

On the other hand, if it is determined that the charge is made by broadcasting streams (S521-Y), a message to ask whether the user wants to view the broadcasting stream is displayed along with a message to report that the corresponding digital content is a charged broadcasting stream. It is then determined if the user wishes to view the stream (S522). If it is determined that the user has selected to view the broadcasting stream (S522-Y), the control unit 110 controls the message generation unit 140 to generate a response message corresponding to "YES" (S523), and the response message is transmitted to the broadcasting stream provider (S524). The broadcasting stream is then received (S525). However, if it is determined that the user refuses the viewing of the broadcasting stream (S522-N), the control unit 110 controls the message generation unit 140 to generate a response message corresponding to "NO" (S535). Then, the message transmission unit 145 transmits the corresponding response message to the provider of the broadcasting stream (S540).

If the response message corresponds to "YES", the provider of the broadcasting stream continuously transmits the following broadcasting stream, and the control unit 110 receives and outputs the following broadcasting stream (S525). If the response message corresponds to "NO", the provider of the broadcasting stream does not transmit the following broadcasting stream.

On the other hand, if it is determined in operation S520 that the viewing of the broadcasting stream is not permitted (S520-N) as a result of judgment by the viewing judgment unit 131, the viewing judgment unit 131 provides the result of the judgment to the control unit 110, and the control unit 110 judges whether the charge is made by broadcasting streams (S530). If it is determined that the broadcasting stream is free of charge or the charge for the broadcasting stream is made at a flat rate (S530-N), the control unit 110 intercepts the output of the broadcasting stream (S532).

On the other hand, if it is determined that the charge is made by broadcasting streams (S530-Y), the control unit 110 controls the message generation unit 140 to generate a response message corresponding to "NO" (S535), and controls the message transmission unit 145 to transmit the generated response message to the provider of the broadcasting stream (S540).

As described above, the mobile communication terminal according to exemplary embodiments of the present invention judges whether the user of the corresponding mobile communication terminal can view or download the corresponding digital content or the broadcasting stream by comparing the content information included in the digital content or the broadcasting stream with the pre-stored viewing restriction information. Accordingly, the mobile communication terminal can prevent juveniles and children from being exposed to content for adults, such as violence and lewdness, and thus be helpful for their mental health.

In addition, the viewing restriction information stored in the mobile communication terminal cannot be directly changed by the user who is a child or juvenile, but the viewing restriction information can be changed only when the user visits an after-sales service center or agency, being accompanied by user's protector. Accordingly, children and juveniles are prevented from changing the viewing restriction information without permission, and thus anxiety of their parents who are worrying that their children may have been exposed to information for adults.

From the foregoing, it will be apparent that the present invention provides the advantages that it can prevent children and juveniles from being exposed to harmful information such as violence, lewdness, and others, and thus be helpful for their mental health.

The foregoing exemplary embodiments and advantages are merely exemplary and are not to be construed as limiting the present invention. The present inventive concept can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A mobile communication terminal comprising:
   a data judgment module which judges whether to restrict digital content by comparing content information included in a packet of the digital content with viewing restriction information; and a control unit which controls whether to display the digital content in accordance with a result of the judgment of the data judgment module, a packet generation unit which generates a response packet to be transmitted to the provider of the digital content; and a packet transmission unit which transmits the generated response packet to the provider by using information about the provider included in the packet received through the receiving unit;

wherein the data judgment module comprises an information storage unit which stores the viewing restriction information and the viewing restriction information can be changed exclusively by resetting the information storage unit, thereby a user or a user's protector cannot directly change the viewing restriction information, but the viewing restriction information can be changed exclusively by resetting the information storage unit by an after-sales service center or an agency, wherein if the viewing of the digital content is not permitted and the corresponding digital content is fee-based content, the control unit controls the packet generation unit and the packet transmission unit to generate and transmit a response packet to the provider of the corresponding digital content to refuse the downloading of the corresponding digital content.

2. The mobile communication terminal of claim 1, wherein the viewing restriction information is a standard of judgment of whether it is permitted for a user to view the digital content.

3. The mobile communication terminal of claim 1, wherein the data judgment module further comprises:

a viewing judgment unit which judges whether it is permitted for a user to view the digital content by comparing the content information included in the packet with the viewing restriction information and providing the result of the judgment to the control unit.

4. The mobile communication terminal of claim 3, wherein the content information includes at least one of viewing grade information according to an age of a viewer of the digital content, a title, a genre, a speech, a provider, a performer, and a providing channel.

5. The mobile communication terminal of claim 3, wherein the viewing restriction information includes at least one of a user's age, an age group, viewing grade information, a word set by the user, a title, a genre, a speech, a provider, a performer, and a providing channel.

6. The mobile communication terminal of claim 1, further comprising:

a receiving unit which receives the packet of the digital content; and a data processing module which processes the packet received through the receiving unit to provide the packet in a displayable state.

7. The mobile communication terminal of claim 6, wherein if it is judged by the viewing judgment unit that the viewing of the digital content is not permitted, the control unit intercepts a transfer of the packet from the receiving unit to the data processing module.

8. The mobile communication terminal of claim 6, wherein if it is judged by the viewing judgment unit that the viewing of the digital content is not permitted, the control unit controls the data processing module to scramble the packet.

9. The mobile communication terminal of claim 6, wherein if it is judged by the viewing judgment unit that the viewing of the digital content is not permitted, the control unit controls the data processing module not to decompress the packet.

10. The mobile communication terminal of claim 3, wherein the viewing judgment unit comprises:

a parsing part which parses a region of the packet where the content information is stored;

an information extraction part which extracts the content information by decoding the parsed packet region; and a judgment part which reads the viewing restriction information from the information storage unit and judges whether the viewing of the digital content is permitted by comparing the content information with the viewing restriction information.

11. The mobile communication terminal of claim 3, wherein the information storage unit is a built-in memory that includes at least one of a flash memory and a random access memory (RAM).

12. The mobile communication terminal of claim 3, wherein the information storage unit is a detachable external memory.

13. The mobile communication terminal of claim 3, wherein the information storage unit is a subscriber identification module (SIM) card.

14. The mobile communication terminal of claim 3, further comprising a multi-card reader which reads information stored in the memory card and provides the read information to the viewing judgment unit;

wherein the information storage unit is at least one of a secure digital card, a multimedia card (MMC), a memory stick, a compact flash card, a smart media card and a micro drive card.

15. The mobile communication terminal of claim 3, wherein the viewing restriction information stored in the information storage unit can be changed only by a predetermined person.

16. The mobile communication terminal of claim 1, wherein the digital content is at least one of a voice, a text, an image, a moving image and broadcasting information.

17. A method of restricting digital content for a mobile communication terminal, the method comprising:

receiving digital content that is transmitted in a unit of a packet;

judging whether viewing of the digital content is permitted by comparing content information included in the packet with viewing restriction information; and preventing a display of the digital content if it is judged that the viewing of the digital content is not permitted, generating a response packet to be transmitted to the provider of the digital content; and transmitting the generated response packet to the provider of the digital content, wherein the viewing restriction information can be changed exclusively by resetting a memory including the viewing restriction information, thereby a user or a user's protector cannot directly change the viewing restriction information, but the viewing restriction information can be changed exclusively by resetting the information storage unit by an after-sales service center or an agency, wherein if the viewing of the digital content is not permitted and the corresponding digital content is fee-based content, the generating and the transmitting comprise generating and transmitting a response packet to the provider of the corresponding digital content to refuse the downloading of the corresponding digital content.

18. The method of claim 17, wherein the viewing restriction information is a standard of whether it is permitted for a user to view the digital content.

19. The method of claim 17, wherein the content information includes at least one of viewing grade information according to an age of a viewer of the digital content, a title, a genre, a speech, a provider, a performer, and a providing channel.

20. The method of claim 17, wherein the viewing restriction information includes at least one of a user's age, an age group, viewing grade information, a word set by the user, a title, a genre, a speech, a provider, a performer, and a providing channel.

21. The method of claim 17, wherein the preventing the display comprises intercepting a packet from being processed to be in a displayable state.

22. The method of claim 17, wherein the preventing the display comprises scrambling the packet.

23. The method of claim 17, wherein the preventing the display comprises not decompressing the packet.

24. The method of claim 17, wherein the judging whether the viewing of the digital content is permitted comprises:
parsing a region of the packet where the content information is stored;
extracting the content information by decoding the parsed packet region; and
judging whether the viewing of the digital content is permitted by comparing the content information with the viewing restriction information.

25. The method of claim 24, wherein the viewing restriction information is stored in a built-in memory that includes at least one of a flash memory and a random access memory (RAM).

26. The method of claim 24, wherein the viewing restriction information is stored in a detachable external memory.

27. The method of claim 24, wherein the viewing restriction information is stored in a subscriber identification module (SIM) card.

28. The method of claim 24, further comprising reading viewing restriction information.

29. The method of claim 28, wherein the viewing restriction information is read from a memory card, wherein the memory card is at least one of a secure digital card that is a memory card, a multimedia card, a memory stick, a compact flash card, a smart media card, and a micro drive card.

30. The method of claim 24, wherein the viewing restriction information can be changed only by a predetermined person.

31. A mobile communication terminal comprising:
a data judgment module which judges whether to restrict a broadcasting stream by comparing broadcasting content information included in the broadcasting stream with viewing restriction information; and
a control unit which controls whether to display the broadcasting stream in accordance with a result of the judgment from the data judgment module,
a message generation unit which generates a response message to be transmitted to a provider of the broadcasting stream; and
a message transmission unit which transmits the generated response message to the provider by using information about the provider included in the broadcasting stream,
wherein the data judgment module comprises an information storage unit which stores the viewing restriction information and the viewing restriction information can be changed exclusively by resetting the information storage unit, thereby a user or a user's protector cannot directly change the viewing restriction information, but the viewing restriction information can be changed exclusively by resetting the information storage unit by an after-sales service center or an agency,
wherein if the viewing of the digital content is not permitted and the corresponding digital content is fee-based content, the control unit controls the message generation unit and the message transmission unit to generate and transmit a response packet to the provider of the corresponding digital content to refuse the downloading of the corresponding digital content.

32. The mobile communication terminal of claim 31, wherein the viewing restriction information is a standard of judgment of whether it is permitted for a user to view the broadcasting stream.

33. The mobile communication terminal of claim 31, wherein the data judgment module further comprises:
a viewing judgment unit which judges whether a user is permitted to view the broadcasting stream by comparing the broadcasting content information included in the broadcasting stream with the viewing restriction information and providing a result of the judgment to the control unit.

34. The mobile communication terminal of claim 31, wherein the broadcasting content information includes at least one of viewing grade information according to an age of a viewer of the digital content, a title, a genre, a speech, a provider, a performer, and a providing channel.

35. The mobile communication terminal of claim 31, wherein the viewing restriction information includes at least one of a user's age, an age group, viewing grade information, a word set by the user, a title, a genre, a speech, a provider, a performer, and a providing channel.

36. The mobile communication terminal of claim 31, further comprising a data processing module which processes the received broadcasting stream to provide the broadcasting stream in a displayable state.

37. The mobile communication terminal of claim 36, wherein if it is judged by the viewing judgment unit that the viewing of the broadcasting stream is not permitted, the control unit intercepts the broadcasting stream being transferred to the data processing module.

38. The mobile communication terminal of claim 36, wherein if it is judged by the viewing judgment unit that the viewing of the broadcasting stream is not permitted, the control unit controls the data processing module to scramble the broadcasting stream.

39. The mobile communication terminal of claim 36, wherein if it is judged by the viewing judgment unit that the viewing of the broadcasting stream is not permitted, the control unit controls the data processing module to prevent the scrambled broadcasting stream from being descrambled.

40. The mobile communication terminal of claim 36, wherein if it is judged by the viewing judgment unit that the viewing of the broadcasting stream is not permitted, the control unit controls the data processing module to restrict the demodulation of the broadcasting stream.

41. The mobile communication terminal of claim 36, wherein if it is judged by the viewing judgment unit that the viewing of the broadcasting stream is not permitted, the control unit prevents the separation of the broadcasting stream into a video stream and an audio stream.

42. The mobile communication terminal of claim 33, wherein the information storage unit is a built-in memory that includes at least one of a flash memory and a random access memory (RAM).

43. The mobile communication terminal of claim 33, wherein the information storage unit is a detachable external memory.

44. The mobile communication terminal of claim 33, wherein the information storage unit is a subscriber identification module (SIM) card.

45. The mobile communication terminal of claim 33, further comprising a multi-card reader which reads information stored in the memory card and provides the read information to the viewing judgment unit;
    wherein the information storage unit is at least one of a secure digital card, a multimedia card, a memory stick, a compact flash card, a smart media card, and a micro drive card.

46. The mobile communication terminal of claim 33, wherein the viewing restriction information stored in the information storage unit can be changed only by a predetermined person.

47. The mobile communication terminal of claim 31, wherein the broadcasting stream is of either a digital type or an analog type.

48. The mobile communication terminal of claim 31, wherein the broadcasting stream is a stream containing at least one of a voice, a text, an image, a moving image and broadcasting information.

\* \* \* \* \*